US011361371B2

(12) United States Patent
Cooley et al.

(10) Patent No.: US 11,361,371 B2
(45) Date of Patent: Jun. 14, 2022

(54) METHOD, SYSTEM, AND NON-TRANSITORY COMPUTER-READABLE MEDIUM FOR RETAIL

(71) Applicant: KlickTrack, Inc., Bainbridge Island, WA (US)

(72) Inventors: Chris Cooley, Bainbridge Island, WA (US); Parham Farsi, Concord, CA (US); Brendan Hill, Bainbridge Island, WA (US); Steve Kessler, Bainbridge Island, WA (US)

(73) Assignee: Klicktrack, Inc., Bainbridge Island, WA (US)

( * ) Notice: Subject to any disclaimer, the term of this patent is extended or adjusted under 35 U.S.C. 154(b) by 0 days.

(21) Appl. No.: 16/779,325

(22) Filed: Jan. 31, 2020

(65) Prior Publication Data

US 2020/0250740 A1 Aug. 6, 2020

Related U.S. Application Data

(60) Provisional application No. 62/799,689, filed on Jan. 31, 2019.

(51) Int. Cl.
*G06Q 30/06* (2012.01)
(52) U.S. Cl.
CPC ..... *G06Q 30/0641* (2013.01); *G06Q 30/0607* (2013.01); *G06Q 30/0625* (2013.01)
(58) Field of Classification Search
CPC ........... G06Q 30/0641; G06Q 30/0607; G06Q 30/0625
USPC ...................................................... 705/27.1
See application file for complete search history.

(56) References Cited

U.S. PATENT DOCUMENTS

| | | | |
|---|---|---|---|
| 5,897,621 A * | 4/1999 | Boesch | G06Q 20/02 235/379 |
| 6,373,950 B1 | 4/2002 | Rowney | |
| 8,782,096 B2 * | 7/2014 | Abnous | G06F 16/256 707/802 |
| 2003/0115277 A1 * | 6/2003 | Watanabe | H04N 1/0014 709/207 |
| 2007/0168228 A1 | 7/2007 | Lawless | |
| 2007/0168464 A1 * | 7/2007 | Noonan | G16H 10/60 709/218 |
| 2015/0213054 A1 * | 7/2015 | Gale | G09B 29/004 701/450 |

(Continued)

OTHER PUBLICATIONS

Staggs, Brooke. Marijuana merchants, growers squirm as state gets into seed-to-sale tracking system. Sep. 19, 2018. Published by Orange County Register. (Year: 2018).*

(Continued)

*Primary Examiner* — Allison G Wood
(74) *Attorney, Agent, or Firm* — Fish & Richardson P.C.

(57) ABSTRACT

A retail platform is described. The platform provides a uniform retail service experience for users in the cannabis retail industry, including cannabis retail shop owners, managers, and employees. The platform provides a variety of services, including a regulatory compliance translator that is configured to translate information about retail transactions into format specific for and required by different regulatory agencies or computing systems. Other services include a product registry that associates lot/batch numbers used by states to track cannabis with product identifiers used by retailers and customers.

19 Claims, 6 Drawing Sheets

(56) References Cited

U.S. PATENT DOCUMENTS

| | | | |
|---|---|---|---|
| 2015/0363725 A1* | 12/2015 | Andersson | G06Q 10/06313 |
| | | | 705/7.23 |
| 2016/0063435 A1 | 3/2016 | Shah et al. | |
| 2017/0004422 A1 | 1/2017 | Todd et al. | |
| 2017/0124564 A1* | 5/2017 | Pi Farias | G06Q 30/018 |
| 2019/0005492 A1* | 1/2019 | Subramanya | G06Q 20/405 |
| 2019/0005558 A1* | 1/2019 | Morris | G06Q 20/40 |
| 2020/0192786 A1* | 6/2020 | Kim | G06F 11/3636 |

OTHER PUBLICATIONS

International Search Report and Written Opinion of the International Searching Authority dated May 28, 2020, in International Patent Application No. PCT/US20/16284, 7 pages.

International Preliminary Report on Patentability in International Appln. No. PCT/US2020/016284, dated Aug. 12, 2021, 6 pages.

* cited by examiner

Fig. 3A

3A00: A process for transaction management

3A01: In a first computing system, translating retail transaction events

3A02: Subscribing to a message queue managed by a second computing system

3A03: Receiving a message from the message queue

3A04: Translating the payload data of the message to generate payload data represented according to a second schema

3A05: Transmitting the payload data represented according to the second schema to a third computing system

Fig. 3B

3B00: The process of 3A00, further comprising:

3B01: Providing a product registry that associates batch/lot identifiers with product identifiers, wherein the batch/lot identifiers each identify a batch of a corresponding product

3B02: Converting, at a point of sale terminal and based on the product registry, a product identifier into a batch/lot identifier that is required by a regulatory compliance system to record a sale of the product

3B03: Transmitting the message to the message queue, wherein the message includes the product identifier and the batch identifier

Fig. 3C

3C00: The process of 3A00, further comprising:

3C01: Receiving a response from the third computing system indicating success or failure

Fig. 3D

*3D00*: The process of *3C00*, further comprising:

*3D01*: In response to the response indicating success, initiating one or more success functions by publishing a message to the message queue

Fig. 3E

*3E00*: The process of *3C00*, further comprising:

*3E01*: In response to the response indicating failure, initiating one or more failure functions

METHOD, SYSTEM, AND NON-TRANSITORY COMPUTER-READABLE MEDIUM FOR RETAIL

CROSS REFERENCE TO RELATED APPLICATIONS

This application claims priority to U.S. Provisional Patent Application No. 62/799,689, entitled "RETAIL PLATFORM," filed Jan. 31, 2019, the entire content of which is incorporated herein by reference.

TECHNICAL FIELD

The present disclosure relates to a cannabis retail platform configured to manage product inventory, point-of-sale transactions, and compliance activities.

BACKGROUND

Cannabis production, distribution, processing, and sale is highly regulated. Since legalization has proceeded on a state-wise basis, parties engaged in the cannabis industry face a patchwork of laws, rules, regulations, and workflows. In some states, even individual counties or cities may have their own rules.

Government agencies provide compliance systems/databases that enforce cannabis regulations. For example, to track cannabis throughout its product lifecycle, regulations may require that cannabis lots be registered with the compliance system at production, distribution, and ultimately sale to the end user. One example of such a compliance system is the California Cannabis Track-and-Trace System ("CTTT"). Such compliance systems are in many cases inefficient and unfriendly to users. Moreover, different states or jurisdictions typically utilize difference compliance systems, that use non-standard APIs, data models, user interfaces, and the like.

The variation in compliance systems results in a fracturing of client applications, libraries, and services that use those systems. Client applications and systems become more complex because they must support various API and database formats. Different compliance systems may also require different workflows, which may ultimately be surfaced in a client application, thereby confusing the user experience. New features may also need to be customized and optimized for each jurisdiction.

BRIEF DESCRIPTION OF THE DRAWINGS

FIGS. 3A-3E are flow diagrams of processes performed by example embodiments.

DETAILED DESCRIPTION

Embodiments described herein provide enhanced computer- and network-based methods and systems for retail management, and more specifically cannabis retail information and operation management. Some embodiments provide a cannabis retail platform ("CRP") that is configured to provide a uniform retail service experience for users in the cannabis retail industry (e.g., cannabis retail shop owners, managers, and employees).

1. Platform Overview

Figure 1:
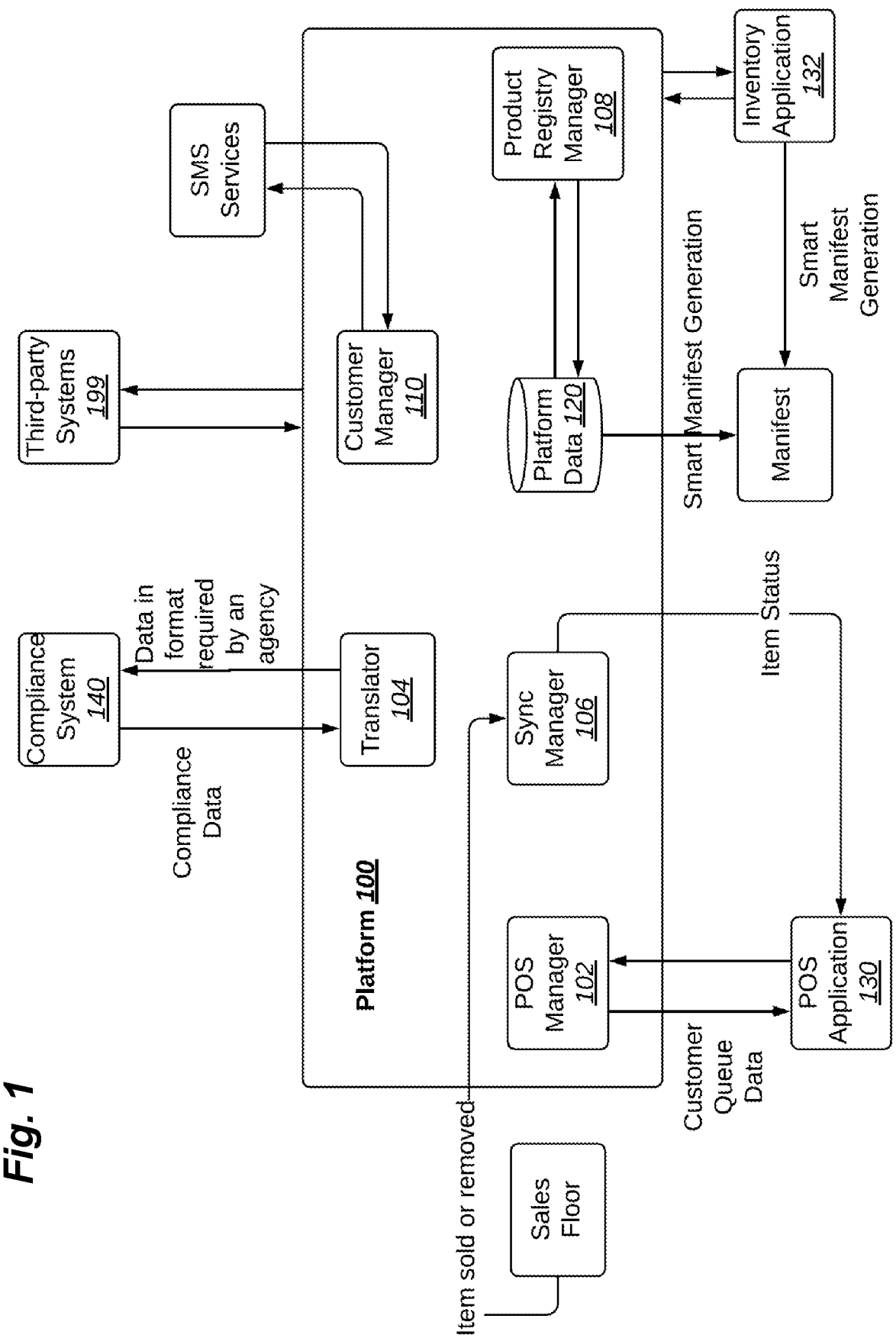
FIG. 1 is a block diagram of retail platform according to an example embodiment.

FIG. 1 is a block diagram of cannabis retail platform according to an example embodiment. FIG. 1 shows an example CRP 100 (sometimes referred to as "the platform"). The platform 100 includes a point-of-sale manager ("POS") 102, a compliance translator 104, a synchronization ("sync") manager 106, a product registry manager 108, and a customer manager 110. The platform 100 is configured to interact with one or more external devices, systems, and applications, such as a point-of-sale device or application 130, a back-office computing system or application 132 (e.g., inventory management, book keeping, employee time keeping), a compliance system 140, and other third-party systems or applications 199.

The compliance translator 104 facilitates regulatory compliance by implementing compliance translation services. The platform 100 provides a uniform user interface metaphor and object/data model so that it can be deployed without changes that are perceptible to users in different jurisdictions. The platform 100 uses the compliance translator 104 to translate retail events, such as sales transactions, into the form, format, and interaction required by a regulatory compliance computing system operated by a state agency.

As one example, when a retailer sells a unit of inventory, that sale must be recorded in the state compliance computing system, in order to comply with the state's tracking regulations. Each state may have different regulations and/or compliance computing systems that implement those regulations. The platform 100 provides the salesperson a uniform experience for completing the transaction with the customer. Behind the scenes, the platform 100 uses the compliance translator 104 to translate the transaction into a form that is acceptable to the specific compliance system 140 operated by the jurisdiction (e.g., state, county) in which the transaction occurred.

The platform 100 also includes a product registry manager 108 that greatly simplifies the management of cannabis products. States typically use a lot-based approach to tracking cannabis. Each lot (e.g., a quantity of material produced by a particular producer) is assigned an identifier, and that identifier may be encoded in a barcode or similar machine-readable format. Different harvests or batches of the same strain produced by a single producer are typically assigned different lot numbers. While this lot-based approach may be effective in testing and tracking cannabis from seed to sale, it is at odds with the way prior art retail computing systems are structured. Such systems are implemented around the concept of items (products) produced under a particular brand. The described techniques, via the product registry and other described mechanisms, address the technical shortcomings in prior art retail computing systems.

The product registry manager 108 manages a product registry that addresses the mismatch between regulatory and retail requirements. The product registry associates each lot (identified by a lot number) with an existing product that has one or more unit/price combinations. For example, the registry may associate lot number 99234 with an existing product that may have multiple unit/price combinations. This allows the platform to store and track historical sales data associated with products, which in turn enables data analytics that can be presented to retailers in terms that correspond to the sales experience. In some embodiments, the registry is shared between multiple different retailers, possibly on a fee-based access model. The registry benefits from a network effect. The benefits of the registry increase non-linearly with the number of users: each additional user of the registry benefits from the entire network of users that are all adding to the combined knowledge base represented by the registry. The registry may be stored as part of the platform data 120.

In one embodiment, the platform 100 provides various other inventory management services, such as smart manifest generation. When new product is received by a retail establishment, an inbound manifest must be prepared. This manifest must include compliance data, such as party information (e.g., shipper, receiver, and distributor), product information (e.g., product ID numbers, product name, product quantity ordered, product quantity received, costs), receipt confirmation, and the like. Manual completion of such manifests is time consuming and error prone.

The platform 100 can auto-fill and auto-assign many of the necessary manifest fields. Some embodiments employ machine learning techniques learn product information based on historical entries made by users. This learned product information can then be used to auto-fill fields for future manifests. The platform 100 leverages information in the product registry to prepare the inbound manifest. Information about the items shipped/received may then also be stored as inventory information, either locally in the platform data 120 or externally via a third-party inventory system accessed via one of the back-office applications 132.

The platform 100 may also provide synchronization services 106 to keep data consistent between the platform 100 and multiple devices and systems that are present in an example retail establishment. As one example, when an item is scanned (e.g., by the salesperson), a signal is emitted to all devices subscribed to a register or queue associated with the scanner. The sync manager 106 then updates all the devices (e.g., registers, tablets) to show the newly scanned item. If that item is sold or removed it will update all corresponding devices to show these changes.

For synchronization purposes, the platform 100 reduces all payloads down to numeric IDs and defers any "human-readable" data until that data is requested by a user interface view. This allows for the storage of large amounts of data in an app (e.g., an app running on a POS register or tablet) with a small data footprint. This technique also provides a faster user experience because all the data is in-app and available to pre-render views where needed. The platform defers all content and component rendering until needed via lazy loading/rendering. For example, if a user is only using the register, then none of the components needed to render the dashboard will be loaded unless the user needs them. These techniques allow the platform 100 to take a reactive approach to the data in the app and create slices of the current application state. Thus, the platform only makes changes to the data that has been modified instead of calling a new set of data.

The POS manager 102 manages the point-of-sale experience. The POS manager 102 may for example provide an order queue for handling a stream of customers. Customer orders may be logged in and tracked via a queue, such that information may be retained while handling multiple customers concurrently. Data stored in the queue may be transmitted to other POS devices 130 (e.g., registers, mobile devices) using the above-described synchronization techniques. The queue may also be used to import and process pre-orders from online menus and/or third-party systems. For example, a user (who is remote from the retail location) may place order with a mobile device. This order can be imported into the queue, so that the order can be fulfilled and ready by the time the user later reaches the store.

The customer manager 110 handles one or more of customer tracking, loyalty, and communication. The customer manager 110 may interact with external messaging services (e.g., SMS services) to communicate with customers. Purchases made by a given customer may be transmitted to the customer manager 110 using the above-described synchronization techniques.

Figure 2:
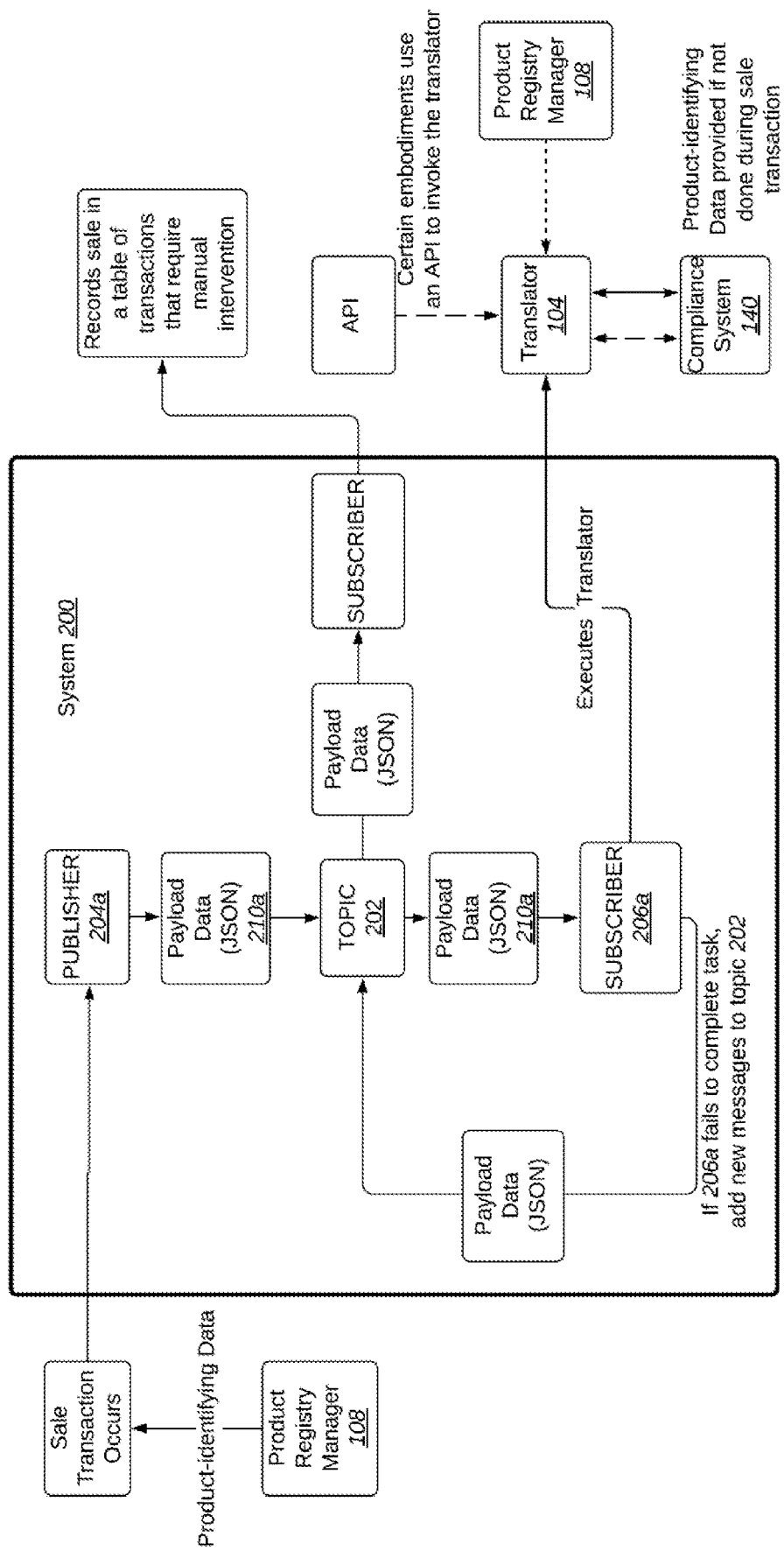
FIG. 2 is a block diagram of an example publish-subscribe system used by an example embodiment.

FIG. 2 is a block diagram of an example publish-subscribe ("pub-sub") system 200 used by an example embodiment. The system 200 is a topic-based system in which publishers can publish messages (herein also referred to as "events") to a topic, and subscribers receive all messages/events published to topics to which they subscribe. In the illustrated example, the system 200 includes a topic 202, publishers 204, subscribers 206, and messages 210. The system 200 may be part or the platform 100, or alternatively hosted by one of the third-party systems 199. Although the techniques are here described with respect to a single topic, many distinct topics are managed in typical embodiments.

The publish-subscribe system 200 may be used to manage the execution of various services provided by the platform 100. For example, the pub-sub system 200 may facilitate purchase and sale transaction as follows. First, upon receiving payment for a purchase and sale transaction, the platform 100 (as publisher 204) publishes a sales message 210a to the topic 202. The sales message 210a is a data object that is represented according to a first schema. For example, the message 210a may be an XML message that includes key-value pairs specifying a number of data fields: a location field identifying a state, county, or other jurisdiction; an action field identifying the event as arising from a sales action; and payload data, such as price, product ID, batch or lot number, quantity, and the like. Other representation schemes are contemplated, including JSON, text delimited, binary, and the like.

The message 210a is then transmitted to any subscribers that subscribe to the topic of the message. In this example, the sales message is transmitted to one or more subscribers 206 that execute the compliance translator 104. In typical embodiments, there is one compliance translator for each jurisdiction (e.g., state), such that the compliance translator is specialized for translating a sales transaction that is generically expressed according to a first schema into the specific format, protocol, and interactions according to a second schema required by a particular compliance system 140.

Continuing the above example, suppose that subscriber 206a executes the compliance translator 104 for the state identified in the sales message 210a. The subscriber 206a (and thus the translator 104) receives the message 210a and translates the necessary formats and/or data (e.g., currency, product identifiers). The translator 104 translates the payload data by, for example, translating key names or values to different names or values. For example, the translator 104 may translate key names into corresponding key names required by a compliance system 140. As another example, the translator 104 may translate a product identifier into a lot/batch identifier as required by a compliance system. Other translations are contemplated, including currency translation, date/time translations, language translation, and the like. After translating the message 210a, the translator 104 interacts with a corresponding state-run compliance system 140 to record the sale.

Once a subscriber 206 completes its task, it may add new messages to the topic 202 or some other topic, thereby causing the platform 100 to invoke other services. For example, once the subscriber 206a successfully records the sales transaction with the compliance system 140, the subscriber 206a adds a message identifying the successful action to one or more other topics. Subscribers to this action may include modules that record the sale in a reporting table, record loyalty points for the customer, transmit a receipt or other communication to the customer, perform an inventory operation, or the like.

If a subscriber 206 fails to complete its task, it may similarly add new messages to the topic 202 or some other topic. For example, suppose subscriber 206a fails to record the sales transaction with the compliance system 140, such as because the system 140 is down, the interface for communicating with the system 140 has changed, or the like. After optionally retrying the transaction, the subscriber 206a then adds a message identifying the failed operation to a corresponding topic. A subscriber (e.g., subscriber 206a) for that topic may, for example, record the sale in a table of transactions that require manual intervention. In some embodiments, the decision as to whether retry the transaction or the number of times the transaction is retried is configurable, possibly based on the rules, interfaces, or other characteristics of the specific jurisdiction. For example, for retail establishments in California, the system may be configured to retry 3 times, whereas for retail establishments in Oregon, the system may be configured to retry just once (or even not at all).

An example compliance translator may also benefit from information provided by the product registry manager 108. As described above, the registry manager 108 associates batch or lot numbers with product identifiers. These associations can be made available at the point of sale, so that the message 210a can include both the product identifier and the batch/lot number. The included batch/lot number is then communicated by the compliance translator to the compliance system 140 for processing. In other embodiments, the compliance translator itself interacts during translation with the registry manager 108 to convert product identifiers to batch/lot numbers.

Some embodiments provide an application program interface ("API") that facilitates access to the platform or some portions or functions thereof. For example, one example API may allow third-party system to invoke the translator 104 to perform state-specific data format translations and optionally interact with the relevant state-run compliance system. Such an API facilitates the development of retail systems that have little or no knowledge of the implementation details necessary for interacting with specific state compliance system. The API may be "open," meaning that access to third parties is granted on a non-discriminatory basis, possibly in exchange for a fee.

2. Example Processes

FIGS. 3A-3E are flow diagrams of processes performed by example embodiments.

FIG. 3A is a flow diagram of example logic for transaction management. The illustrated logic in this and the following flow diagrams may be performed by, for example, one or more modules of the platform 100 and related components described with respect to FIGS. 1 and 2, above. FIG. 3A illustrates a process 3A00 that includes the following block(s).

Block 3A01 includes in a first computing system, translating retail transaction events, by: performing block(s) 3A02, 3A03, 3A04 and 3A05, described below. Example retail transactions include purchase and sale transactions, item returns, inventory updates, manifest creation, or the like.

Block 3A02 includes subscribing to a message queue managed by a second computing system. In some embodiments, the second computing system manages a publish-subscribe system such as that described with reference to FIG. 2. The second computing system uses a message queue or similar object to record incoming messages from publishers and communicate those messages to corresponding subscribers.

Block 3A03 includes receiving a message from the message queue, wherein the message specifies a location, an action, and payload data, wherein the payload data is represented according to a first schema. The received message identifies an action, such as a retail purchase and sale transaction that occurred at the specified location (e.g., state, county, or other jurisdiction). The payload is used to describe the particulars of the action, such has quantity, price, product identifier, and the like.

Block 3A04 includes translating the payload data of the message to generate payload data represented according to a second schema. The process translates the payload data, such as by translating key names or values to different names or values. For example, the process may translate key names into corresponding key names required by a compliance system. As another example, the process may translate a product identifier into a lot/batch identifier as required by a compliance system. Other translations are contemplated, including currency translation, date/time translations, and the like.

Block 3A05 includes transmitting the payload data represented according to the second schema to a third computing system, wherein the transmitted data is in a format required by the third computing system, and wherein the third computing system records the transaction by storing at least some of the payload data. The third computing system may be a regulatory compliance computing system that is accessed via an API that requires specific message and data formats defined by the second schema.

FIG. 3B is a flow diagram of example logic illustrating an extension of process 3A00 of FIG. 3A. FIG. 3B illustrates a process 3B00 that includes the process 3A00, and which further includes the following block(s).

Block 3B01 includes providing a product registry that associates batch/lot identifiers with product identifiers, wherein the batch/lot identifiers each identify a batch of a corresponding product. Here, the process may provide the product registry manager 108 or similar module.

Block 3B02 includes converting, at a point of sale terminal and based on the product registry, a product identifier into a batch/lot identifier that is required by a regulatory compliance system to record a sale of the product. As discussed above, the registry manager 108 maintains associations between batch/lot identifiers used by the state to track sales and product identifiers used by retailers.

Block 3B03 includes transmitting the message to the message queue, wherein the message includes the product identifier and the batch identifier. The process transmits the message describing the transaction to the message queue, so that it can be processed by the compliance translator and/or other modules described herein.

FIG. 3C is a flow diagram of example logic illustrating an extension of process 3A00 of FIG. 3A. FIG. 3C illustrates a process 3C00 that includes the process 3A00, and which further includes the following block(s).

Block 3C01 includes receiving a response from the third computing system indicating success or failure. After the third computing receives the payload data, it may respond with a success or failure indicator. For example, if the third computing system is a regulatory compliance system, it may respond with a success code indicating that the transaction was successfully recorded. Alternatively, if there are erroneous inputs, system errors, scheduled downtime, the compliance system may respond with an indicator of such. The success/failure indicator causes the process to perform subsequent actions in response, as described further below. In the case of a failure condition, the actions taken by the process may be configured to depend on the particular rules of a given jurisdiction. For example, in some jurisdictions, retail establishments are not permitted to complete a sale unless the transaction is successfully recorded with the compliance system. In such cases, the process would notify the point of sale system that the transaction cannot be completed. In other jurisdictions, it may be permitted to complete the sale and later make a (possibly manual) recording of the sale with the compliance system. The described platform and its modules are configured to implement such jurisdiction-specific logic, so that the appropriate and legal actions are taken at the retail level.

FIG. 3D is a flow diagram of example logic illustrating an extension of process 3C00 of FIG. 3C. FIG. 3D illustrates a process 3D00 that includes the process 3C00, and which further includes the following block(s).

Block 3D01 includes in response to the response indicating success, initiating one or more success functions by publishing a message to the message queue. Upon success, the process may invoke other platform services by publishing another message to the message queue (or some other queue). A success message will, in turn, cause other subscribers to perform follow-on actions, such as recording the transaction in a local database, adding loyalty points to a customer account, transmitting a follow-on communication (e.g., sales receipt) to the customer, or the like.

FIG. 3E is a flow diagram of example logic illustrating an extension of process 3C00 of FIG. 3C. FIG. 3E illustrates a process 3E00 that includes the process 3C00, and which further includes the following block(s).

Block 3E01 includes in response to the response indicating failure, initiating one or more failure functions including retrying the communication with the third computing system. Upon failure, the process may invoke other platform services by publishing another message to the message queue (or some other queue). This failure message will, in turn, cause other subscribers to perform follow-on actions, such as recording the failed compliance translation such that it can be retried (possibly manually) at a later time. Other actions are contemplated, such as reporting the failure (e.g., by email/text) to the appropriate employee, recording the failure for analytic purposes, or the like.

3. Example Computing System Implementation

Figure 4:
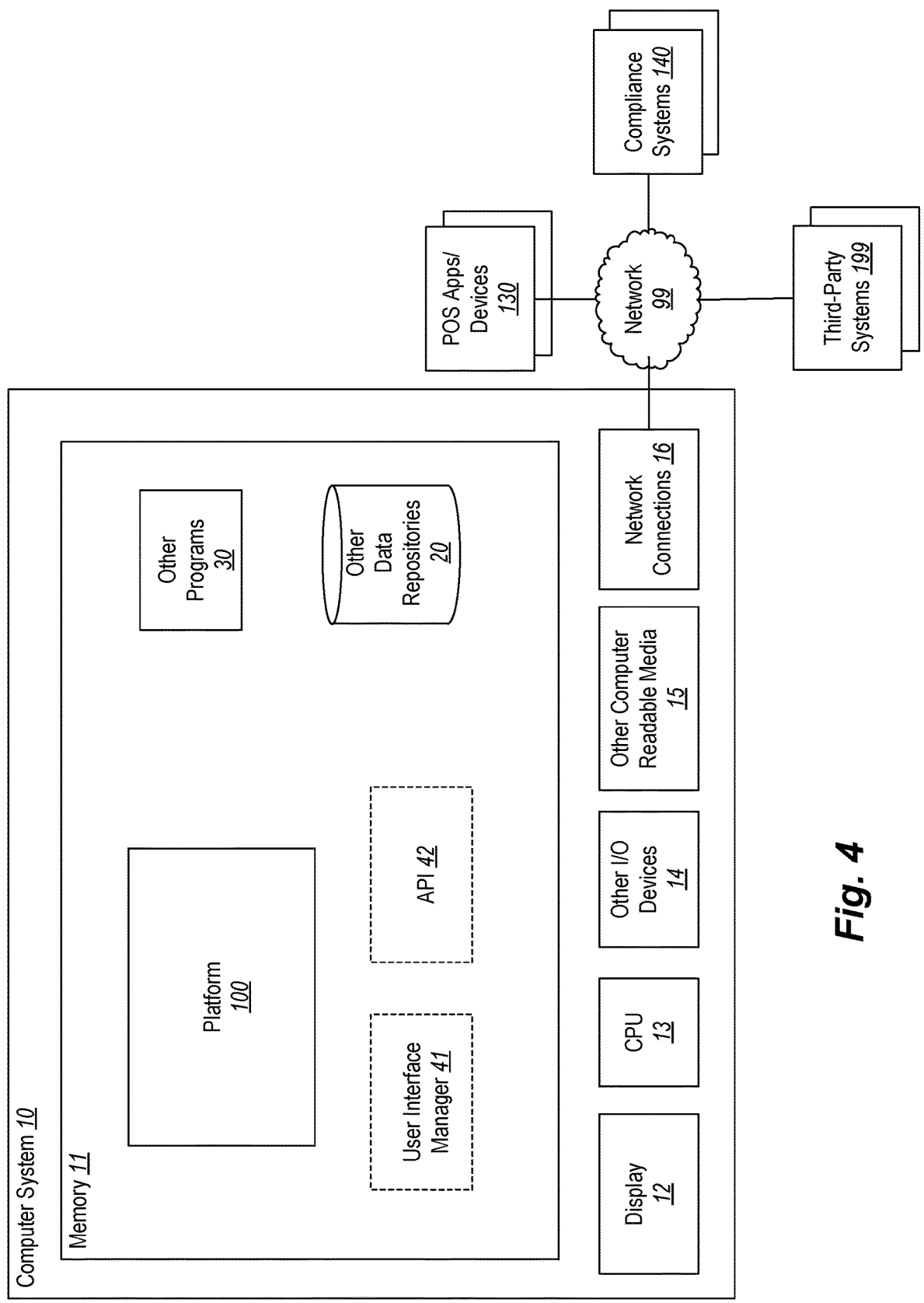
FIG. 4 is a block diagram of a computing system for implementing a retail platform according to an example embodiment.

FIG. 4 is a block diagram of a computing system for implementing retail platform according to an example embodiment. In particular, FIG. 4 shows a computing system 10 that may be utilized to implement a platform 100.

Note that one or more general purpose or special purpose computing systems/devices may be used to implement the platform 100. However, just because it is possible to implement the techniques or systems described herein on a general-purpose computing system does not mean that the techniques or systems themselves or the operations required to implement the techniques are conventional or well known. The inventive techniques improve specific technologies and otherwise provide numerous advances over the prior art, as described herein.

The computing system 10 may comprise one or more distinct computing systems/devices and may span distributed locations. Furthermore, each block shown may represent one or more such blocks as appropriate to a specific embodiment or may be combined with other blocks. Also, the platform 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connection 16. The platform 100 is shown residing in memory 11. In other embodiments, some portion of the contents, some or all of the components of the platform 100 may be stored on and/or transmitted over the other computer-readable media 15. The components of the platform 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the illustrated components may not be present in any specific implementation. For example, some embodiments may not provide other computer-readable media 15 or a display 12.

The platform 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the system that hosts the platform 100.

The UI manager 41 provides a view and a controller that facilitate user interaction with the platform 100 and its various components. For example, the UI manager 41 may provide interactive access to the platform 100, such that users can interact with the platform 100, such as by providing a graphical user interface that is configured to facilitate control and management of the platform 100. In some embodiments, access to the functionality of the UI manager 41 may be provided via a Web server, possibly executing as one of the other programs 30. In such embodiments, a user operating a Web browser executing on a point of sale ("POS") device 130 or some other client device can interact with the platform 100 via the UI manager 41.

The API 42 provides programmatic access to one or more functions of the platform 100. For example, the API 42 may provide a programmatic interface to one or more functions of the platform 100 that may be invoked by one of the other programs 30 or some other module. In this manner, the API 42 facilitates the development of third-party software, such as user interfaces, plug-ins, adapters (e.g., for integrating functions of the platform 100 into Web applications), and the like.

In addition, the API 42 may be in at least some embodiments invoked or otherwise accessed via remote entities, such as code executing on one of the POS devices 130, compliance system 140, and/or third-party systems 199, to access various functions of the platform 100. For example, a POS device 130 may initiate and process a sales transaction via the API 42. The API 42 may also be configured to provide management widgets (e.g., code modules) that can be integrated into the third-party systems 55 and that are configured to interact with the platform 100 to make at least some of the described functionality available within the context of other applications (e.g., mobile apps).

The platform 100 interacts via the network 99 with POS devices 130, compliance systems 140, and third-party systems/applications 199. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 199 may include any systems that provide data to, or utilize data from, the platform 100, including Web browsers, messaging systems, supplemental data sources, backup systems, and the like.

In an example embodiment, components/modules of the platform 100 are implemented using standard programming techniques. For example, the platform 100 may be implemented as a "native" executable running on the CPU 13, along with one or more static or dynamic libraries. In other embodiments, the platform 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., Scala, M L, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the platform 100, such as the platform data 120 and/or the other data repositories 20, can be available by standard mechanisms such as through database APIs; libraries for accessing files, databases, or other data repositories; or through Web servers, FTP servers, or other types of servers providing access to stored data. The platform data 120 and the other data repositories 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the platform 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet are incorporated herein by reference, in their entireties.

From the foregoing it will be appreciated that, although specific embodiments have been described herein for purposes of illustration, various modifications may be made without deviating from the spirit and scope of this disclosure. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, etc.).

The invention claimed is:
1. A method for transaction management, the method comprising:
    in a first computing system,
        translating retail transaction events, by:
            subscribing to a message queue managed by a second computing system;

receiving a message from the message queue, wherein the message specifies a location where a sales transaction of a product has occurred, an action, and first payload data, wherein the first payload data is represented according to a first schema and comprises a product identifier of the product;

in response to receiving the message specifying the location where the sales transaction of the product has occurred, identifying a state compliance system operated by a state government associated with the location;

invoking, using an application program interface (API), a compliance translator to translate the first payload data of the message to generate second payload data represented according to a second schema, wherein the second schema is required by the state compliance system associated with the location, and wherein translating the first payload data comprises translating the product identifier of the product that was purchased at the location into a batch/lot identifier encoded in a machine-readable format according to the second schema required by the state compliance system operated by the state government associated with the location, wherein the state compliance system is configured to track production, distribution and sales of the product using the batch/lot identifier; and transmitting the second payload data represented according to the second schema to the state compliance system, wherein the transmitted data is in a format required by the state compliance system, and wherein the state compliance system records the transaction by storing at least some of the second payload data.

2. The method of claim 1, further comprising:

receiving the first payload data that includes a first set of key-value pairs that are represented according to the first schema;

generating a second set of key-value pairs that represents the second payload data according to the second schema; and transmitting the second set of key-value pairs to the state compliance system.

3. The method of claim 1, wherein the receiving the message from the message queue includes: receiving the message that specifies a state, county, or government entity as the location.

4. The method of claim 1, wherein the receiving the message from the message queue includes: receiving the message that specifies the sales transaction as the action.

5. The method of claim 1, wherein the translating the first payload data of the message to generate the second payload data represented according to the second schema includes: converting at least one name or value of a key-value pair to a different name or value.

6. The method of claim 1, wherein the translating the first payload data of the message to generate the second payload data represented according to the second schema includes: converting at least one value of a key-value pair to a different value, wherein the at least one value is a purchase price expressed in a first currency.

7. The method of claim 1, further comprising:

providing a product registry that associates batch/lot identifiers with product identifiers, wherein the batch/lot identifiers each identify a batch of a corresponding product;

converting, at a point of sale terminal and based on the product registry, the product identifier into the batch/lot identifier that is required by the state compliance system to record a sale of the product; and transmitting another message to the message queue, wherein the other message includes the product identifier and the batch identifier.

8. The method of claim 1, further comprising: receiving a response from the state compliance system indicating a success or a failure of recording the transaction.

9. The method of claim 8, further comprising: in response to the response indicating a success of recording the transaction, initiating one or more success functions by publishing another message indicating the success to the message queue.

10. The method of claim 8, further comprising: in response to the response indicating a failure of recording the transaction, initiating one or more failure functions including retrying a communication with the state compliance system.

11. The method of claim 10, wherein the in response to the response indicating the failure, initiating one or more failure functions includes: retrying the communication a specified number of times before reporting the failure, thereby causing manual processing of the transaction.

12. A system for transaction management, the system comprising:

a processor;

a memory; and a module that is stored in the memory and that is configured, when executed by the processor, to translate retail transaction events, by:

subscribing to a message queue managed by a second computing system;

receiving a message from the message queue, wherein the message specifies a location where a sales transaction of a product has occurred, an action, and first payload data, wherein the first payload data is represented according to a first schema and comprises a product identifier of the product;

in response to receiving the message specifying the location where the sales transaction of the product has occurred, identifying a state compliance system operated by a state government associated with the location;

invoking, using an application program interface (API), a compliance translator to translate the first payload data of the message to generate second payload data represented according to a second schema, wherein the second schema is required by the state compliance system associated with the location, and wherein translating the first payload data comprises translating the product identifier of the product that was purchased at the location into a batch/lot identifier encoded in a machine-readable format according to the second schema required by the state compliance system operated by the state government associated with the location, wherein the state compliance system is configured to track production, distribution and sales of the product using the batch/lot identifier; and to transmit the second payload data represented according to the second schema to the state compliance system, wherein the transmitted data is in a format required by the state compliance system, and wherein the state compliance system records the transaction by storing at least some of the second payload data.

13. The system of claim 12, wherein the module is further configured to:
   receive the first payload data that includes a first set of key-value pairs that are represented according to the first schema;
   generate a second set of key-value pairs that represents the second payload data according to the second schema; and
   transmit the second set of key-value pairs to the state compliance system.

14. The system of claim 12, wherein
   the message specifies a state, county, or government entity as the location; and
   the message specifies a sales transaction as the action; and
   wherein the module is further configured to convert at least one name or value of a key-value pair to a different name or value, and to convert at least one value of a key-value pair to a different value, wherein the at least one value is a purchase price expressed in a first currency.

15. The system of claim 12, wherein the module is further configured to:
   provide product registry that associates batch/lot identifiers with product identifiers;
   convert, at a point of sale terminal and based on the product registry, the product identifier into the batch/lot identifier that is required by the state compliance system to record a sale of the product; and
   transmit another message to the message queue, wherein the other message includes the product identifier and the batch/lot identifier.

16. The system of claim 12, wherein the module is further configured to: receive a response from the state compliance system indicating a success or a failure of recording the transaction.

17. The system of claim 16, wherein the module is further configured to: in response to the response indicating a success of recording the transaction, initiate one or more success functions by publishing another message identifying the success to the message queue.

18. The system of claim 16, wherein the module is further configured to: in response to the response indicating a failure of recording the transaction, initiate one or more failure functions including retrying a communication with the state compliance system a specified number of times before reporting the failure, thereby causing manual processing of the transaction.

19. A non-transitory computer-readable medium storing instructions that, when executed by one or more computing systems, cause the one or more computing systems to perform operations comprising:
   in a first computing system, translating retail transaction events, by:
      subscribing to a message queue managed by a second computing system;
      receiving a message from the message queue, wherein the message specifies a location where a sales transaction of a product has occurred, an action, and first payload data, wherein the first payload data is represented according to a first schema and comprises a product identifier of the product;
      in response to receiving the message specifying the location where the sales transaction of the product has occurred, identifying a state compliance system operated by a state government associated with the location;
      invoking, using an application program interface (API), a compliance translator to translate the first payload data of the message to generate second payload data represented according to a second schema, wherein the second schema is required by the state compliance system associated with the location, and wherein translating the first payload data comprises translating the product identifier of the product that was purchased at the location into a batch/lot identifier encoded in a machine-readable format according to the second schema required by the state compliance system operated by the state government associated with the location, wherein the state compliance system is configured to track production, distribution and sales of the product using the batch/lot identifier; and
   transmitting the second payload data represented according to the second schema to the state compliance system, wherein the transmitted data is in a format required by the state compliance system, and wherein the state compliance system records the transaction by storing at least some of the second payload data.

* * * * *